United States Patent
Ueno

(10) Patent No.: US 8,150,093 B2
(45) Date of Patent: Apr. 3, 2012

(54) DISPLAY DEVICE

(75) Inventor: Satoshi Ueno, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1359 days.

(21) Appl. No.: 11/748,006

(22) Filed: May 14, 2007

(65) Prior Publication Data
US 2007/0274547 A1  Nov. 29, 2007

(30) Foreign Application Priority Data
May 24, 2006  (JP) ................... 2006-144015

(51) Int. Cl.
*H04R 1/02* (2006.01)
(52) U.S. Cl. ............... 381/388; 381/390; 381/395
(58) Field of Classification Search ............ 381/301, 381/390, 395
See application file for complete search history.

(56) References Cited

U.S. PATENT DOCUMENTS

| | | | | |
|---|---|---|---|---|
| 5,190,258 A | * | 3/1993 | Yu | 248/279.1 |
| 5,852,545 A | * | 12/1998 | Pan-Ratzlaff | 361/679.23 |
| 5,970,161 A | * | 10/1999 | Takashima et al. | 381/386 |
| 6,527,237 B2 | * | 3/2003 | Harary et al. | 248/221.11 |
| 2005/0047624 A1 | * | 3/2005 | Kleen | 381/388 |

FOREIGN PATENT DOCUMENTS

| | | |
|---|---|---|
| JP | 2000-221922 | 8/2000 |
| JP | 2000-244845 | 9/2000 |
| JP | 2000-253333 | 9/2000 |
| JP | 2005-033395 | 2/2005 |

* cited by examiner

*Primary Examiner* — Davetta W Goins
*Assistant Examiner* — Amir Etesam
(74) *Attorney, Agent, or Firm* — Global IP Counselors

(57) ABSTRACT

A display device includes a display unit, a sound unit, a speaker positioning mechanism and a speaker attaching mechanism. The display unit is configured to display images. The sound unit is configured to output audio. The sound unit has top and bottom left speakers and top and bottom right speakers. The speaker positioning mechanism is configured to detachably support the sound unit and move the sound unit away from and close to the display unit in a lateral direction of the display unit. The speaker attaching mechanism is configured to detachably couple the sound unit to upper and lower faces of the display unit.

8 Claims, 6 Drawing Sheets

DISPLAY DEVICE

CROSS-REFERENCE TO RELATED APPLICATIONS

This application claims priority to Japanese Patent Application No. 2006-144015 filed on May 24, 2006. The entire disclosure of Japanese Patent Application No. 2006-144015 is hereby incorporated herein by reference.

BACKGROUND OF THE INVENTION

1. Field of the Invention

The present invention generally relates to a display device. More specifically, the present invention relates to a display device having speakers.

2. Background Information

As shown in FIGS. 3A and 3B, a conventional display device has a substantially rectangular cabinet 122 and a stereo speaker device 130 (See Japanese Laid-Open Patent Application 2005-33395, for example). The cabinet 122 houses a flat display panel 121 for displaying images. The stereo speaker device 130 includes a left channel reproduction speaker device 131L and a right channel reproduction speaker device 131R. The left and right channel reproduction speaker devices 131L and 131R are substantially the same size. As shown in FIG. 3B, the left and right channel reproduction speaker devices 131L and 131R are configured to be detachably disposed on left and right side faces 122L and 122R of the cabinet 122. In addition, as shown in FIG. 3A, the left and right channel reproduction speaker devices 131L and 131R are configured to be detachably disposed on a top face 122U or a bottom face 122D of the cabinet 122. Furthermore, longitudinal lengths of the left channel reproduction speaker device 131L and the right channel reproduction speaker device 131R is no more than half a longitudinal length of the cabinet 122.

As shown in FIGS. 4A-4C, another conventional display device has an image display unit 201 and left and right speakers 202 and 203 (See Japanese Laid-Open Patent Application 2000-253333, for example). The image display unit 201 displays an image. The left and night speakers 202 and 203 output audio. Relative positions of the image display unit 201 and the left and right speakers 202 and 203 are varied horizontally based on a signal received from an infrared beam receiver.

As shown in FIGS. 5A and 5B, another conventional display device has an image display unit 301 and left and right speakers 302 and 303 (See Japanese Laid-Open Patent Application 2000-221922, for example). The image display unit 301 displays an image. The left and right speakers 302 and 303 output audio. Relative positions of the image display unit 301 and the left and right speakers 302 and 303 are changed horizontally by using handles 309 so that the left and right speakers 302 and 303 are positioned at desired positions.

As shown in FIGS. 6A-6C, another conventional display device has a cabinet 403 and left and right speakers (See Japanese Laid-Open Patent Application 2000-244845, for example). The left and right speakers are rotated around a shaft 411 of the cabinet 403. Each of the left and right speakers has a speaker attachment plate 410 and a polyurethane rubber piece 412. The shaft 411 of the cabinet 403 is press-fitted into the polyurethane rubber piece 412. Thereby, friction force is produced between the shaft 411 and the polyurethane rubber piece 412. The friction force maintains each of orientations of the left and right speakers.

However, it has been discovered in conventional display devices that the arrangement of the speakers needs more variety.

In view of the above, it will be apparent to those skilled in the art from this disclosure that there exists a need for an improved display device. This invention addresses this need in the art as well as other needs, which will become apparent to those skilled in the art from this disclosure.

SUMMARY OF THE INVENTION

The present invention was conceived in light of the above situation. One object of the present invention is to provide a display device with speakers that are freely arranged.

In accordance with one aspect of the present invention, a display device includes a display unit, a sound unit, a speaker positioning mechanism and a speaker attaching mechanism. The display unit is configured to display images. The sound unit is configured to output audio. The sound unit has top and bottom left speakers and top and bottom right speakers. The speaker positioning mechanism is configured to detachably support the sound unit and move the sound unit away from and close to the display unit in a lateral direction of the display unit. The speaker attaching mechanism is configured to detachably couple the sound unit to upper and lower faces of the display unit.

The speaker positioning mechanism of the display device is configured to move the sound unit in a lateral direction of the display unit. Furthermore, the speaker attaching mechanism is configured to attach the sound unit to upper and lower faces of the display unit. Therefore, arrangements of the speakers are freely changed.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1A:
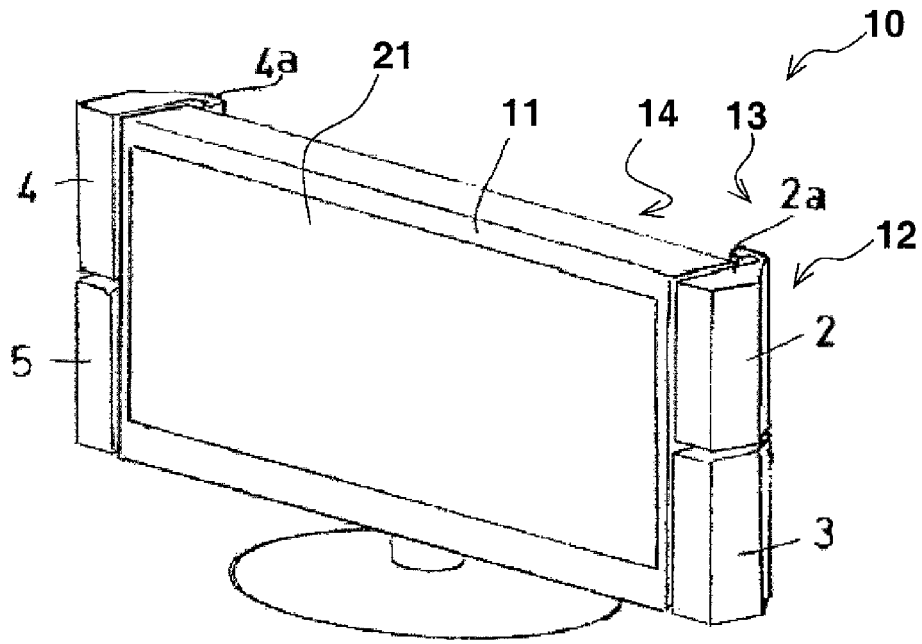
FIG. 1A is an oblique view of a display device showing that speakers are disposed on left and right sides of a display main body.
Figure 1B:
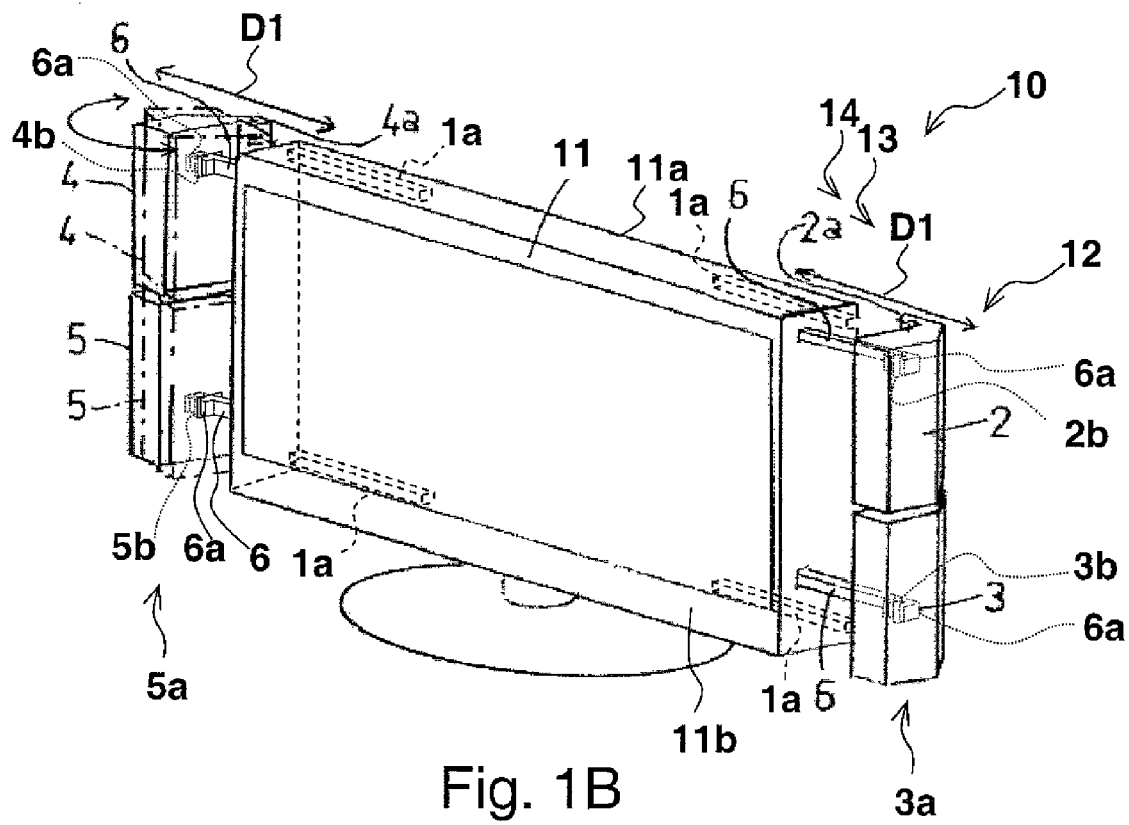
FIG. 1B is an oblique view of the display device showing that the speakers are disposed away from the display main body.
Figure 1C:
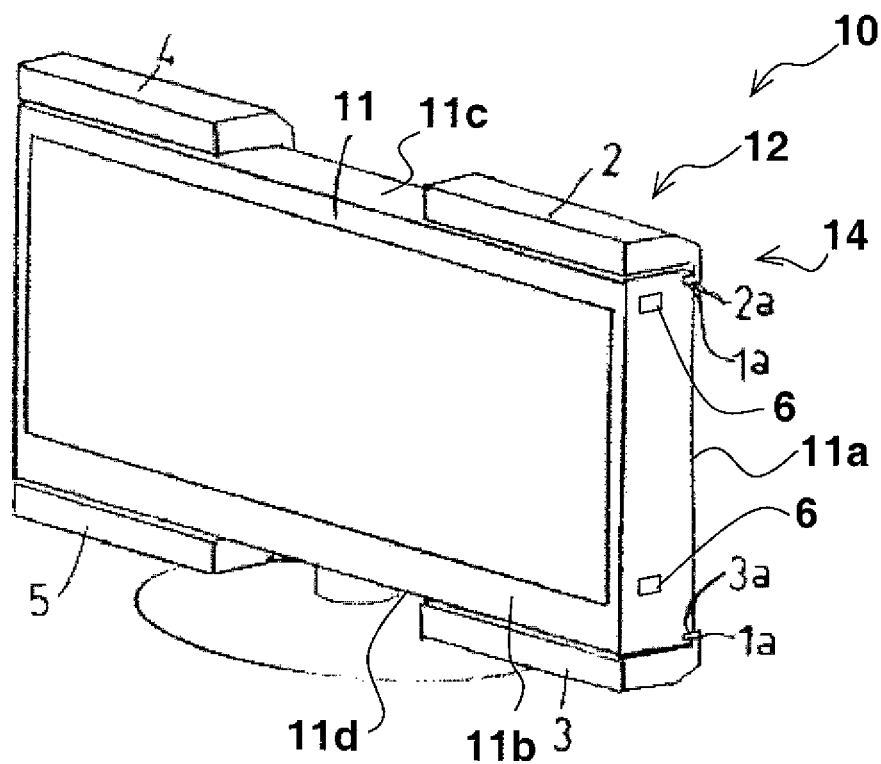
FIG. 1C is an oblique view of the display device showing that the speakers are disposed on upper and lower faces of the display main body.

As shown in FIGS. 1A-1C, a display device 10, such as a flat panel television, has a display main body (or display unit) 11, a speaker unit (or sound unit) 12, a speaker positioning mechanism 13 and a speaker attaching mechanism 14. The display main body 11 houses a flat display panel 21 for displaying images. As shown in FIG. 1A, the speaker unit 12 includes two pairs of vertically stacked speakers on left and right sides of the display main body 11. Specifically, the speaker unit 12 has a top right speaker 2, a bottom right speaker 3, a top left speaker 4 and a bottom left speaker 5.

The speaker positioning mechanism 13 is disposed between the display main body 11 and the speaker unit 12 to position the speaker unit 12 horizontally with respect to the display main body 11. As shown in FIG. 1B, the speaker positioning mechanism 13 includes four arms 6 disposed at the display main body 11. The arms 6 attachably and detachably support the speakers 2, 3, 4 and 5. The arms 6 are configured to be extended and retracted in a lateral direction D1 of the display main body 11 so that the speakers 2, 3, 4, and 5 are disposed at desired positions to the left and right of the display main body 11. Therefore, the speakers 2, 3, 4, and 5 are configured to be moved away from and closer to the display main body 11 in the lateral direction D1.

Figure 2:
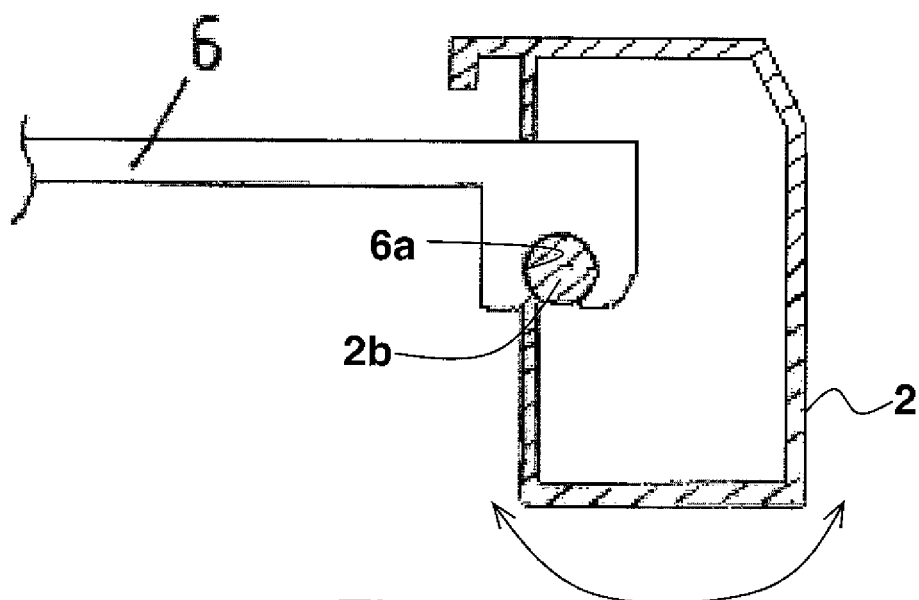
FIG. 2 is a plan view cross section of a speaker positioning mechanism.
Figure 3A:
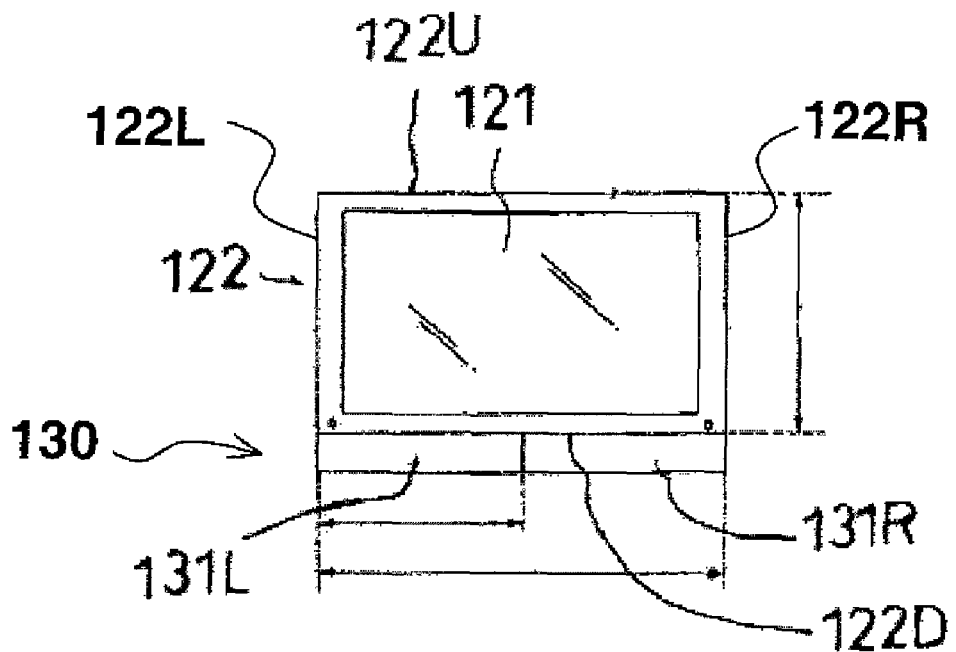
FIG. 3A is a front view of a conventional display device in a state that a stereo speaker device is attached to a bottom face of a cabinet.
Figure 3B:
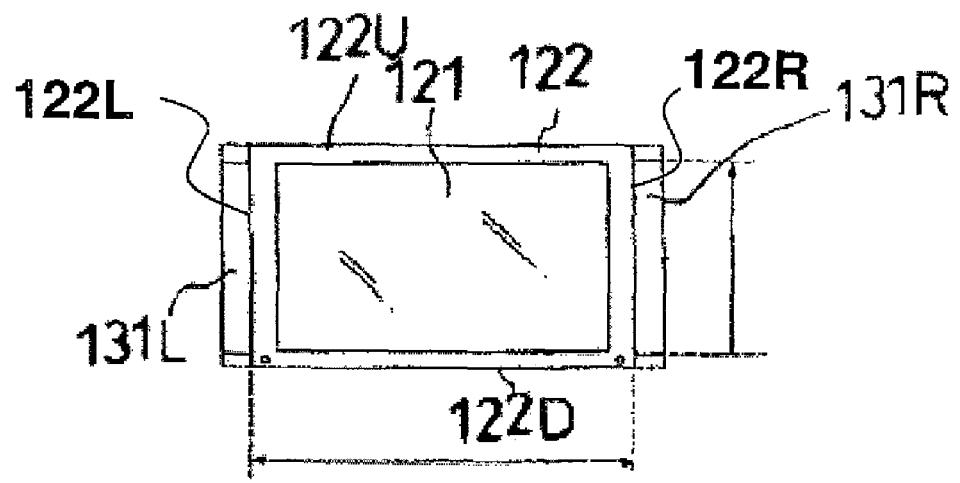
FIG. 3B is a front view of the conventional display device in a state that the stereo speaker device is attached to left and right side faces of the cabinet.
Figure 4A:
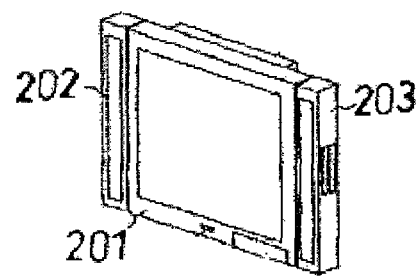
FIG. 4A is an oblique view of another conventional display device in a state that the speakers are stowed away.
Figure 4B:
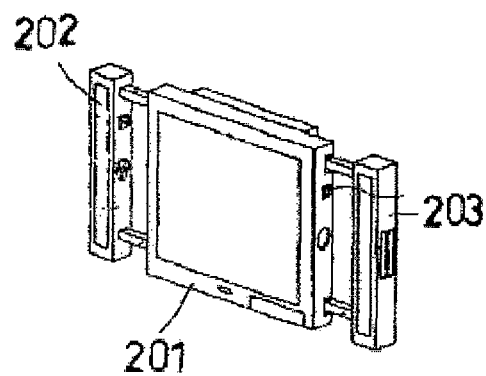
FIG. 4B is an oblique view of the another conventional display device in a state that the speakers are deployed.
Figure 4C:
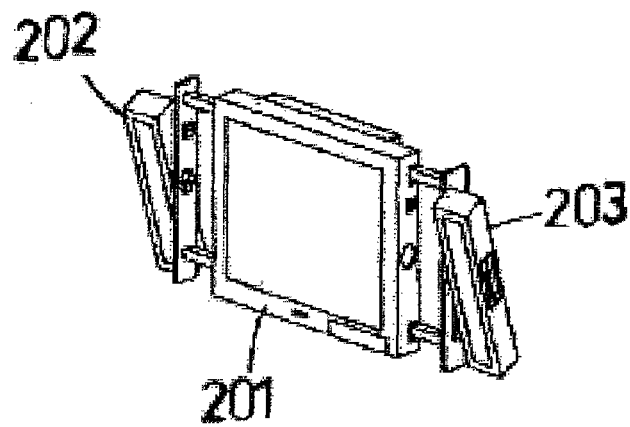
FIG. 4C is an oblique view of the another conventional display device in a state that the speakers are rotated.
Figure 5A:
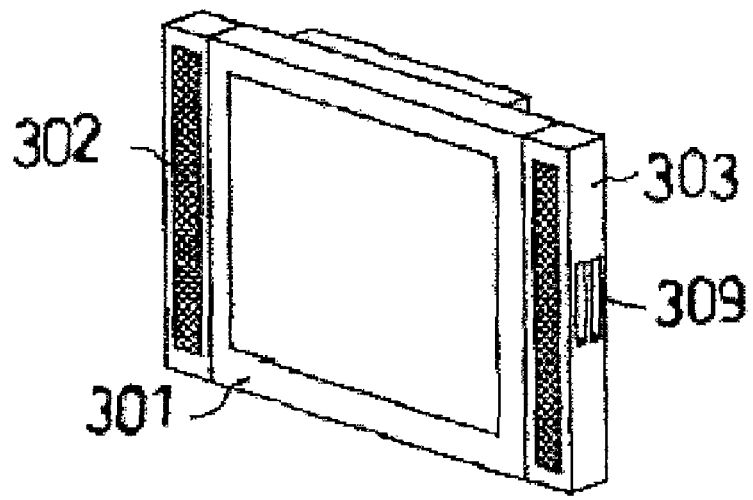
FIG. 5A is an oblique view of another conventional display device in a state that the speakers are stowed away.
Figure 5B:
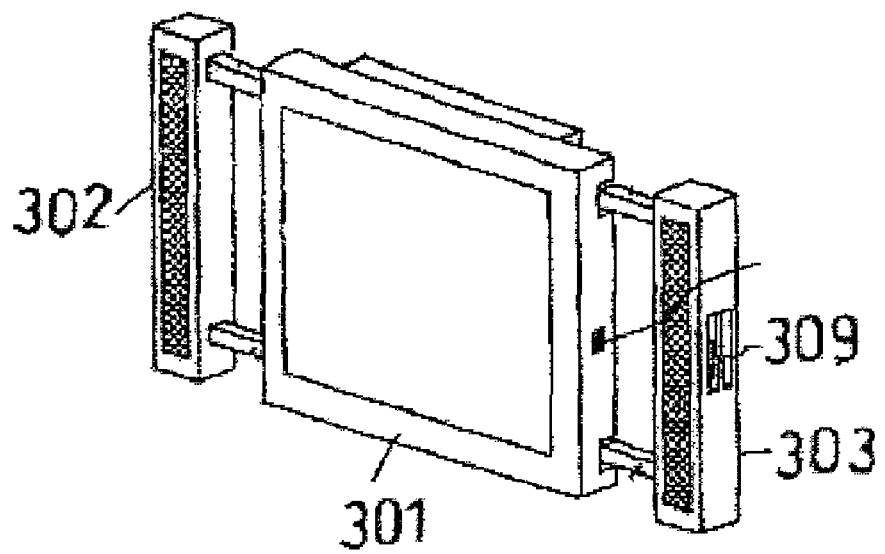
FIG. 5B is an oblique view of the another conventional display device in a state that the speakers are deployed.
Figure 6A:
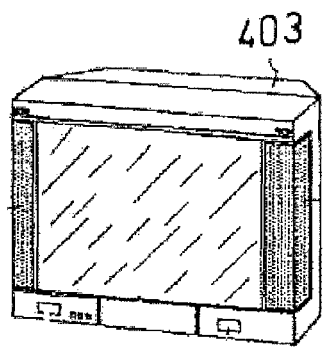
FIG. 6A is an oblique view of another conventional display device.
Figure 6B:
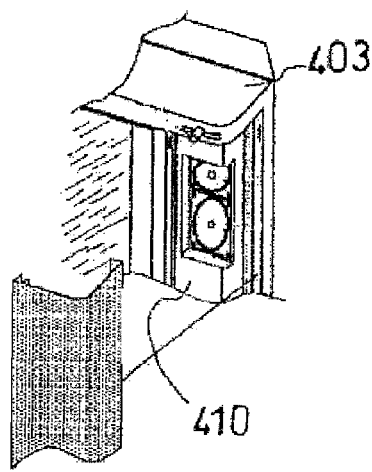
FIG. 6B is a partially exploded oblique view of the another conventional display device.
Figure 6C:
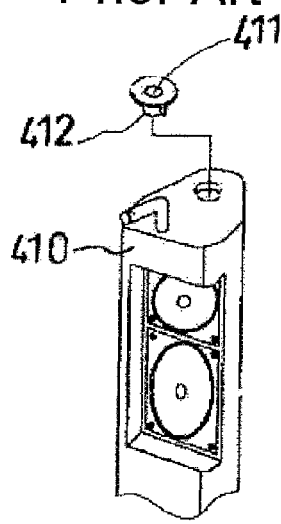
FIG. 6C is a partially exploded oblique view of a speaker attachment plate of the another conventional display device.

Furthermore, the speaker positioning mechanism 13 rotatably supports the speaker unit 12. Specifically, the arms 6 of the speaker positioning mechanism 13 rotatably support the speakers 2, 3, 4 and 5, respectively. More specifically, as shown in FIGS. 1B and 2, a shaft-insertion circular groove (or axle bearing) 6a is formed at each end of the arms 6. Furthermore, cylindrical shafts (or axels) 2b, 3b, 4b and 5b are vertically disposed at the speakers 2, 3, 4, and 5, respectively. Each of the shafts 2b, 3b, 4b and 5b is inserted in a corresponding one of the shaft-insertion circular grooves 6a. The cylindrical shafts 2b, 3b, 4b and 5b are detachably coupled to the shaft-insertion circular grooves 6a so that the top and bottom left speakers 4 and 5, and the top and bottom right speakers 2 and 3 are rotatable with respect to the display main body 11. For example, referring to FIG. 2, a shaft 2b of the top right speaker 2 is attachably and detachably inserted in the shaft-insertion circular groove 6a. Accordingly, the top right speaker 2 is rotatably supported by one of the arms 6. When removing the speakers 2, 3, 4 and 5 from the arms 6, the shafts 2b, 3b, 4b and 5b are moved to upper sides of the speakers 2, 3, 4 and 5 and taken out of the shaft-insertion circular grooves 6a of the arms 6. Since the speakers 2, 3, 4, and 5 are configured to be rotated to change angles, the speakers 2, 3, 4, and 5 are freely changed to a desired orientation. Furthermore, since the speakers 2, 3, 4, and 5 are supported by the arms 6 that are configured to be extended or retracted, both horizontal positions and orientations of the speakers 2, 3, 4, and 5 are easily changed to desired positions and desired angles.

The speaker attaching mechanism 14 includes rail grooves (or grooves) 1a and protrusions 2a, 3a, 4a, and 5a. The rail grooves 1a are formed in the lateral direction D1 at four corners or portions (top right, bottom right, top left and bottom left) of a back face 11a of the display main body 11. The protrusions 2a, 3a, 4a and 5a are disposed at the speakers 2, 3, 4 and 5, respectively. Specifically, the protrusions 2a, 3a, 4a and 5a are disposed at back side portions of the speakers 2, 3, 4 and 5, respectively, and protrude to a front face 11b of the display main body 11. The protrusions 2a, 3a, 4a and 5a are configured to be slidably fitted to the rail grooves 1a, respectively. Specifically, the protrusions 2a, 3a, 4a and 5a latch the rail grooves 1a, respectively. More specifically, the protrusions 2a, 3a, 4a and 5a are configured to be inserted in the grooves 1a so that the top and bottom left speakers 4 and 5, and the top and bottom right speakers 2 and 3 are attached to the upper and lower faces of the display main body 11. Therefore, as shown in FIG. 1C, the speaker attaching mechanism 14 attaches the speakers 2, 3, 4 and 5 on upper and lower faces 11c and 11d of the display main body 11. In particular, the top right speaker 2 is attached to the rail groove 1a provided at the top right side of the display main body 11. The bottom right speaker 3 is attached to the rail groove 1a provided at the bottom right side of the display main body 11. The top left speaker 4 is attached to the rail groove 1a provided at the top left side of the display main body 11. The bottom left speaker 5 is attached to the rail groove 1a provided at the bottom left side of the display main body 11.

Accordingly, the speaker attaching mechanism 14 is configured to detachably couple the speaker unit 12 to upper and lower faces of the display main body 11. The two pairs of vertically stacked speakers 2, 3, 4 and 5 are freely disposed at left and right positions or at top and bottom positions of the display main body 11. In particular, if there is not enough space to the left or right side of the display main body 11, the speakers 2, 3, 4 and 5 are installed on the upper and lower faces 11c and 11d of the display main body 11. When the speakers 2, 3, 4, and 5 are installed on the upper and lower faces 11c and 11d of the display main body 11, the arms 6 are retracted inside of the display main body 11, as shown in FIG. 1C.

GENERAL INTERPRETATION OF TERMS

In understanding the scope of the present invention, the term "comprising" and its derivatives, as used herein, are intended to be open ended terms that specify the presence of the stated features, elements, components, and groups, but do not exclude the presence of other unstated features, elements, components, and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a display device equipped with the present invention. Accordingly, these terms, as utilized to describe the present invention should be interpreted relative to a display device equipped with the present invention as used in the normal viewing position.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:

1. A display device comprising:
a display unit configured to display images;
a sound unit configured to output audio, the sound unit having top and bottom left speakers and top and bottom right speakers;
a speaker positioning mechanism configured to detachably support the sound unit and move the sound unit away from and close to the display unit in a lateral direction of the display unit; and
a speaker attaching mechanism configured to detachably couple the sound unit to upper and lower faces of the display unit,
the speaker positioning mechanism including arms with axle bearings, and axles that are disposed at the top and bottom left speakers and the top and bottom right speakers,
the arms being configured to extend and retract in the lateral direction, the arms being further configured to rotatably support the top and bottom left speakers and the top and bottom right speakers,
the axles being detachably coupled to the axle bearings so that the top and bottom left speakers and the top and bottom right speakers are rotatable with respect to the display unit, the axles being detached from the arms when the top and bottom left speakers and the top and bottom right speakers are detached,
the axles including cylindrical shafts,
the axle bearings including circular grooves formed on ends of the arms, the top and bottom left speakers and the top and bottom right speakers being rotatable with respect to the display unit about the axles of the speaker positioning mechanism, respectively,
the speaker attaching mechanism including protrusions formed on the top and bottom left speakers and the top and bottom right speakers, respectively, and rail grooves formed on upper and lower portions of a back face of the display unit, respectively, the grooves extending in the lateral direction of the display unit, each rail grooves opening in the back face of the display unit and in a respective one of left and right side faces, and
the protrusions being configured to be slidably coupled to the rail grooves, respectively, so that the top and bottom left speakers and the top and bottom right speakers are attached to the upper and lower faces of the display unit.

2. The display device according to claim 1, wherein the arms are slidably disposed at upper and lower portions of the left and right side faces of the display unit.

3. The display device according to claim 1, wherein the arms are configured to be retracted inside of the display unit when the speaker attaching mechanism is coupled to the sound unit.

4. The display device according to claim 1, wherein the grooves are formed at four corners of the back face of the display unit.

5. The display device according to claim 4, wherein the protrusions are configured to be inserted to the grooves so that the top left and right speakers are attached to the upper face of the display unit and the bottom left and right speakers are attached to the lower face of the display unit.

6. The display device according to claim 5, wherein the protrusions are slidably fitted to the grooves when the sound unit is attached to the upper and lower faces of the display unit.

7. The display device according to claim 1, wherein each of the top and bottom left speakers and the top and bottom right speakers has a housing defining an inner space, and
the axles are disposed within the inner spaces of the top and bottom left speakers and the top and bottom right speakers, respectively.

8. The display device according to claim 7, wherein the axle bearings are inserted within the inner spaces of the top and bottom left speakers and the top and bottom right speakers, respectively, when the axles are coupled to the axle bearings, respectively.

\* \* \* \* \*